(Model.)

E. T. STONE.
CAR BRAKE.

No. 272,348. Patented Feb. 13, 1883.

WITNESSES:
Theo. G. Hoster
C. Sedgwick

INVENTOR:
E. T. Stone
BY Munn & Co
ATTORNEYS.

UNITED STATES PATENT OFFICE.

EDGAR T. STONE, OF SPANISH HOLLOW, OREGON.

CAR-BRAKE.

SPECIFICATION forming part of Letters Patent No. 272,348, dated February 13, 1883.

Application filed August 4, 1882. (Model.)

*To all whom it may concern:*

Be it known that I, EDGAR T. STONE, of Spanish Hollow, in the county of Wasco and State of Oregon, have invented a new and Improved Car-Brake, of which the following is a full, clear, and exact description.

This invention consists of cone friction-clutches combined with the car-wheels having cavities upon the inside for the cones, said cones being fixed so as not to revolve, and also being provided with devices for thrusting them into the cavities of the wheels with great power by the brake wheel or lever, or by the power of one of the car-axles, whereon I have arranged a drum for the purpose with a friction-clutch for setting it in operation, and springs are employed to retract the cones when the brakes are to be taken off, the arrangement being calculated to be much more powerful then the present brakes, at the same time being very substantial and durable, all as hereinafter more fully described.

Reference is to be had to the accompanying drawings, forming part of this specification, in which similar letters of reference indicate corresponding parts in all the figures.

Figure 1:
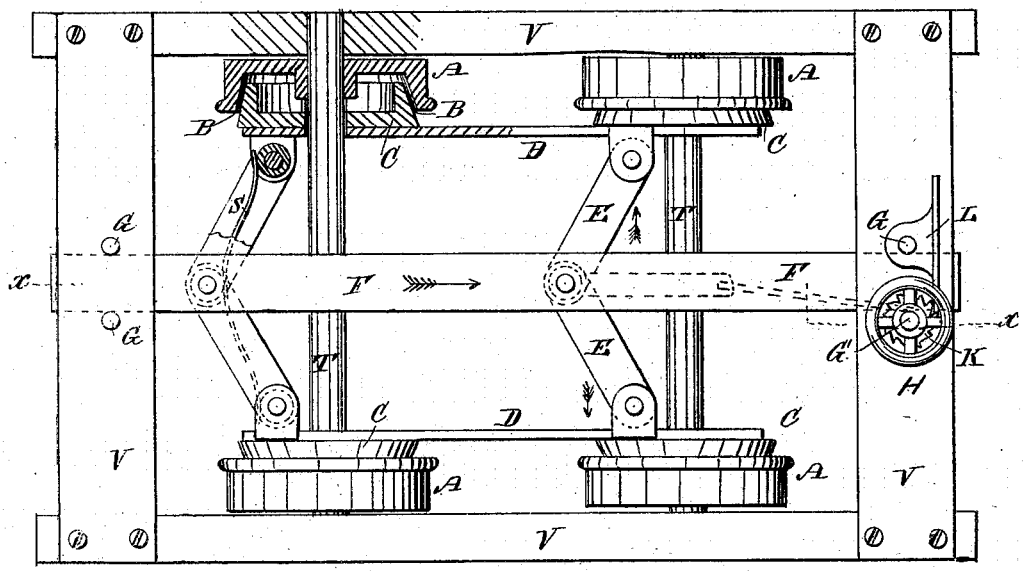
Figure 2:
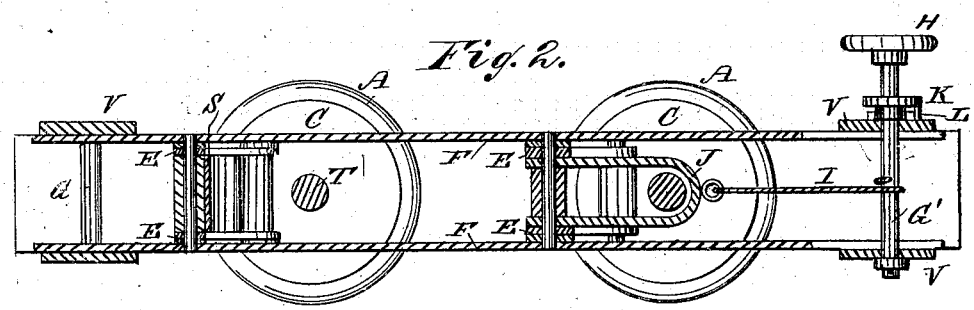
Figure 3:
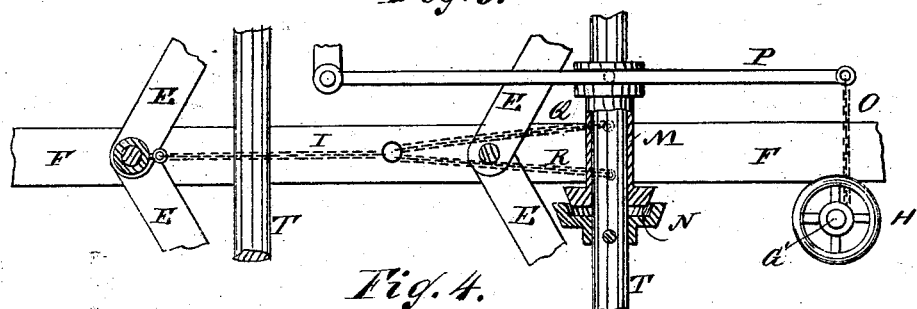
Figure 4:
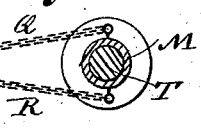

Figure 1 is a plan of a car-truck, showing the arrangement of my improved brake, one of the wheels and also one of the cones being shown in horizontal section. Fig. 2 is a longitudinal section through the truck on line *x x*, Fig. 1. Figs. 3 and 4 are details showing the apparatus I employ for utilizing the power of one of the car-axles for operating the brakes.

The wheels A have a conical cavity, B, upon the inside, and there is a cone, C, to each wheel, the cones of all the wheels of one side of a truck being coupled together by a strong bar, D, to prevent them from revolving; but said cones are movable lengthwise of the axle T to a limited extent for entering the cavities to produce the friction, and for withdrawing therefrom sufficiently to let the wheels go free. For this purpose I have coupled the bars D, by the toggle-joint link E, with a pair of center bars, F, extending from end to end of the truck, and fixed in suitable guides, G, on the truck-frame V, for keeping them in position while shifting forward and backward to work the cones.

In Figs. 1 and 2 I have shown the ordinary brake-wheel, H, and shaft G′, coupled on directly by a chain, I, and a link, J, the latter straddling the axle. I have also shown the usual ratchet, K, and dog L, and I propose to connect any other approved hand-gear for working them; but for greater power I will in some cases employ a drum, M, on one of the axles T, with a friction-clutch, N, to connect it with the axle, so as to be turned by it, and using the hand-wheel H, chain O, and a lever, P, for connecting and disconnecting the clutch N. This contrivance may either be used alone or together with the hand-power devices, also directly connected to the sliding bars F, so that both can be worked together or either alone.

I also propose to connect the slides F to the drum M by a branched chain, I, having two members, Q R—one fixed to the upper side and the other to the lower side of the drum—so that the drum will draw alike on the brake either way the car may be running.

Springs S are employed, as shown, for slacking off the brakes when the brakes are to be disconnected.

Having thus described my invention, what I claim as new, and desire to secure by Letters Patent, is—

1. The string-bar D, connecting two brakes, C C, arranged on each side of car to slide on the axle and exert friction on the wheels, as described.

2. The combination of cones C, toggle-joint links E, sliding bars F, and spring S, with the wheels A, substantially as specified.

EDGAR T. STONE.

Witnesses:
O. S. SAVAGE,
W. S. MYERS.